UNITED STATES PATENT OFFICE.

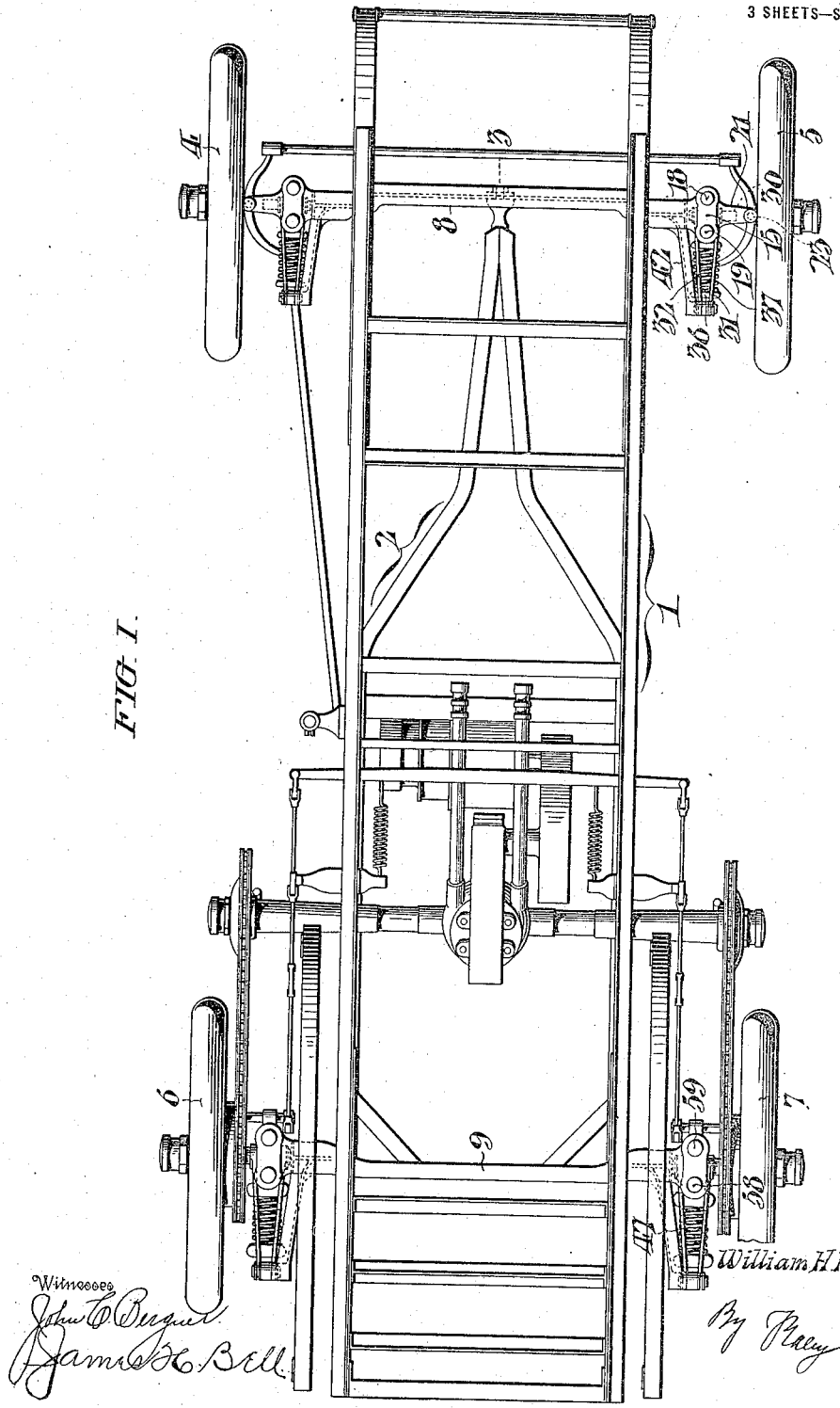

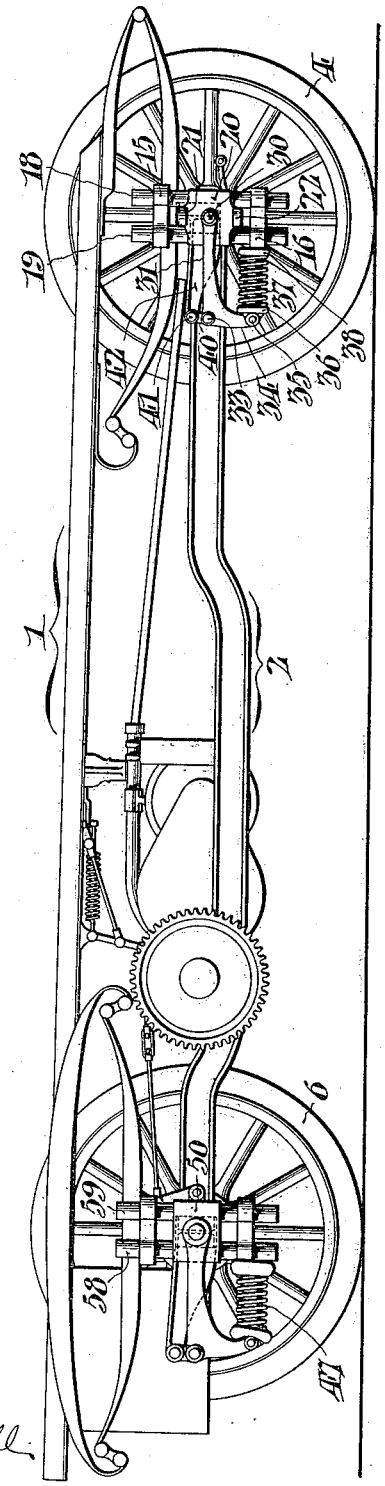

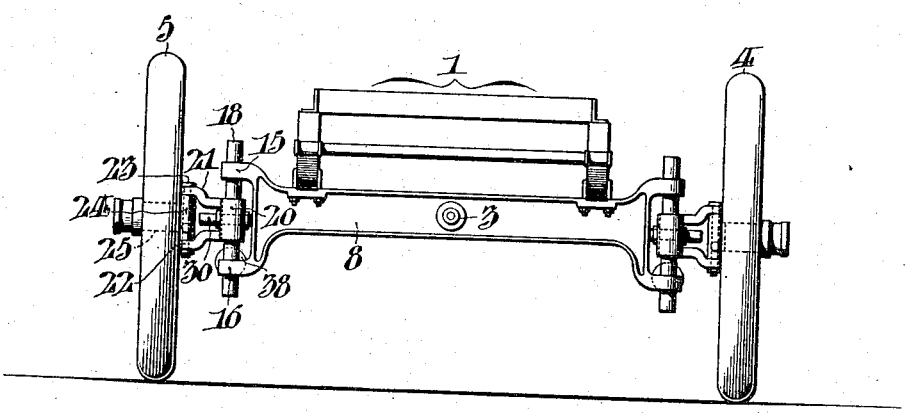

WILLIAM H. HORSTMANN, OF OVERBROOK, PENNSYLVANIA.

SHOCK-ABSORBER.

1,195,585.     Specification of Letters Patent.     Patented Aug. 22, 1916.

Application filed March 11, 1914. Serial No. 823,839.

*To all whom it may concern:*

Be it known that I, WILLIAM H. HORSTMANN, of Overbrook, in the county of Montgomery and State of Pennsylvania, have invented certain new and useful Improvements in Shock-Absorbers, whereof the following is a specification, reference being had to the accompanying drawings.

My invention relates particularly to a shock absorber adapted for use in connection with automobiles and similar vehicles.

In Letters Patent of the United States No. 1,086,917, granted to me under date of February 10th, 1914, I have shown and described a shock absorber having a member carrying the stub-axle of a wheel, and capable of guided sliding movement with relation to the chassis or frame of the vehicle, in a vertical direction, said slidable member being arranged to coöperate with a resilient element and intermediate connections, whereby certain strains, which are ordinarily manifested by movement in a substantially vertical direction, are converted into resultants manifested in a substantially horizontal direction.

The present invention is addressed to the same general purpose, and comprises not only an organization which is novel as a whole, but some novel improvements in certain individual elements thereof, which render them capable of embodiment in an organization otherwise substantially identical with that of my said former patent, by way of substitution for elements described therein.

In the accompanying drawings, I have shown an embodiment of my invention in connection with the chassis, or frame, of an ordinary automobile, whose wheels are mounted upon stub-axles, the rear wheels in this instance being represented as being driven by means of a chain gear, but it will be understood that my invention is not restricted to this particular organization.

In said drawings, Figure I, represents a top or plan view of said structure, having my invention applied thereto. Fig. II, is a view in side elevation of the structure, the wheels, stub-axles, and attachments for the steering and braking mechanism being removed, in order to more clearly show the other parts. Fig. III, is a view thereof in front elevation, the steering mechanism being removed for the reasons above mentioned.

The chassis of the vehicle may comprise the rectangular upper frame, indicated comprehensively at 1, and a lower frame 2, whose members are attached to the rear main axle 9, at widely separated points, but converge at their front extremity to a point of pivotal attachment at 3, to the front main axle 8, this being a well known system of construction.

Various adjunctive devices, such as elliptical springs, driving, braking and steering mechanism, are partly indicated in order to show their general relation to the organization, but need not be particularized, as they are well understood, and furthermore, constitute no part of the present invention.

The front wheels are represented at 4, and 5, and the rear wheels at 6, and 7, respectively. As each of said wheels is provided with the combined devices which are comprised in my present invention, it will only be necessary to describe in detail one such organization, it being understood that the others are substantially similar in construction and mode of operation.

Referring to the front view shown in Fig. III, the main front axle 8, terminates at each end in bifurcated bracket-arms 15, and 16, which lie in the same general vertical plane. The extremities of the bracket-arms are extended in a fore and aft direction, somewhat beyond the width of the axle itself, and each is provided with a pair of vertical apertures, those upon one bracket-arm registering respectively with those upon the other. Said apertures are adapted to receive the rods 18, and 19, which, in this embodiment, fit snugly but so as to move freely therein in a vertical direction only. At the longitudinal central region of the rods 18, and 19, a block 20, is, in this embodiment, rigidly attached to them, said block carrying a pair of stub-arms 21, and 22, lying in the same vertical plane with one another and diverging at their outer ends. A vertical rod 23, is mounted in the outer extremities of the stub-arms 21, and 22, and forms a bearing for a rotatable sleeve 24, mounted in the interspace between them, to which sleeve the stub-axle 25, is secured, thus permitting the shifting of the front stub-axles by the steering mechanism.

The block 20, (which for convenience will be termed a carrier-block), is provided with horizontal trunnions, or journals which are preferably formed by means of a rod or stem 30, extended through a horizontal aperture in the carrier-block and secured therein, so as to protrude on the opposite sides thereof.

The mechanism for converting the vertical movement of the carrier-block into movement of a horizontal member, comprises preferably a bell crank lever, which in this embodiment, is constructed and arranged as follows: The bifurcated arms 31, and 32, which constitute arm members of said lever, are journaled upon the protruding extremities of the rod 30, said arms converging toward one another as they approach the fulcrum of the lever. The other arm member 34, of said lever, is substantially at right angles to the arms 31, and 32, and its lower end is pivotally attached at 35, to the socket-piece 36, of a coil spring 37, having a substantially horizontal axis, and provided with an abutment at 38, upon the rear face of the lower bracket-arm 16. The fulcrum-bearing 33, of the bell crank lever, is mounted in one extremity of a short link 40, whose other extremity is pivotally mounted at 41, in a rigid bracket 42, which projects rearwardly from the front main axle 8. The organization at the rear wheels is similar to that just described, but obviously, the pivotal mounting of the stub-axles, (described in connection with the front wheels, and intended to permit the steering thereof), is inappropriate. They therefore may be secured in any suitable manner to a carrier-block 50, which corresponds to the carrier-block 20, just described, and performs a similar function.

It will be seen that the carrier-blocks, such as those indicated by 20, and 50, are independently mounted with relation to their respective main axles, and are capable of rectilinear movement only, said movement being in substantially vertical direction, since it is guided by the rods such as 18, and 19, or 58, and 59, respectively. It will also be seen that the weight of the chassis and superstructure is ultimately borne by the springs, such as 37, and 47, the downward stress being transmitted thereto through the respective bell crank levers. Said springs resist the downward movement of the main axles with relation to the stub-axles and resist, conversely, the individual, as well as the general, upward movement of the several wheels and their stub-axles, with relation to the chassis.

The strength of the springs 37, and 47, should preferably be such that with the weight of the superstructure and a normal load thereon, the carrier-blocks stand about midway between the upper and lower bracket-arms.

When the vehicle is in motion, if any one of the wheels encounters, and rides over, a raised obstacle, the tendency of that wheel and its carrier-block, is to rise with relation to its main axle, the movement being so controlled by means of the guide rods 18, and 19, in the apertures of the bracket-arms, as to be restricted to a vertical direction. This guided vertical movement is converted by the action of the bell crank lever, into an approximately horizontal movement, which tends to compress its spring 37; hence the strain due to the resisted movement, and the resilient shock of the spring, are manifested in a substantially horizontal direction, which, in this instance, is fore and aft with the vehicle.

As the point of attachment of the bell crank lever arm to the carrier-block is restricted to a rectilinear movement, and as the said arm must have rotative movement with relation to the fulcrum of the lever, it is necessary to provide means for permitting this relative action of the parts, and to this end I provide means, preferably such as those above described, for permitting the controlled bodily movement of the fulcrum-bearing of the bell crank lever. Hence I am enabled to employ a rigid lever as the element for converting direction of movement, and thus simplify the construction of that portion of the system, while by the employment of positive guiding mechanism for the carrier-block, I minimize the strain or shock upon the pivotal members in the connecting mechanism, said guiding mechanism bearing substantially all the shock and strain in a fore and aft direction.

Referring now to my above mentioned former patent, it will be noted that the underlying principle of operation, by which the strain due to riding over an obstacle is divided into two resultants, one of which is borne in a fore and aft direction, by the guiding mechanism, the other of which is manifested by vertical movement of the carrier-block, and said last mentioned resultant is so converted as to be manifested by spring resisted movement in a horizontal direction, may be considered broadly as similar to that of the present invention, and that the peculiar mode of operation permitted by the movable fulcrum of the bell crank lever, is the equivalent of the action of the rolling geared engagement in the structure of said former patent, although the details of such equivalent mechanism are mechanically simplified.

It will also be seen that the system of mounting and guiding the carrier-block of the stub-axle in the present device, is, *per se*, an improvement upon the system shown in said former patent. The employment of guiding members having a circular cross section, facilitates the construction and proper fitting of correlated guiding members, and affords a greater resistance to strain with a given weight of material; the employment of a plurality of distinct and separated guiding members advantageously distributes the strain and enhances the freer movement of the guided parts.

In the preferred embodiment above shown, the guide rods are rigidly attached to the carrier-block and move with relation to the bracket arms, but I do not limit my broader claims to this particular detail.

Having thus described my invention, I wish it to be understood that I do not broadly claim the use of a bell crank lever, as a member of a spring supporting mechanism for a vehicle body, as I am aware that such use has been heretofore suggested.

I also wish it to be understood that while I employ in my specification and claims, the expressions "vertical" and "horizontal", said terms are not to be interpreted as strictly technical, but are merely used as conveniently indicating the directions of movement or relative positions of structural parts in a general sense, and without any restrictive intention.

I claim:

1. The combination, with a wheel and its stub-axle, of a carrier block for said stub-axle; a main axle having guide apertures arranged vertically above and below said carrier block; a guide piece connected to said carrier block, and adapted to move vertically in said guide apertures; a substantially right-angled bell crank lever, having a horizontal arm pivotally connected to the carrier block; a spring connected to the vertical arm of said lever; an abutment for said spring; a fulcrum for said lever; and a swinging carrier for said fulcrum, substantially as set forth.

2. The combination, with a wheel and its stub-axle, of a carrier block for said stub-axle; a main axle having guide apertures arranged vertically above and below said carrier block; a guide piece connected to said carrier block and adapted to move vertically in said guide apertures; a rigid bracket extending horizontally from said main axle; a substantially right-angled bell crank lever, having a bifurcated horizontal arm embracing said carrier block and pivotally connected thereto on opposite sides thereof; a spring connected to the vertical arm of said lever; an abutment for said spring; a fulcrum for said lever; and a link pivotally mounted upon said bracket and carrying said fulcrum, substantially as set forth.

In testimony whereof, I have hereunto signed my name, at Philadelphia, Pennsylvania, this sixth day of March, 1914.

WILLIAM H. HORSTMANN.

Witnesses:
JAMES H. BELL,
E. L. FULLERTON.

Copies of this patent may be obtained for five cents each, by addressing the "Commissioner of Patents, Washington, D. C."